P. GOLOMBECK.
CYLINDER WELDING APPARATUS.
APPLICATION FILED JULY 8, 1914.

1,188,927.

Patented June 27, 1916.
4 SHEETS—SHEET 1.

Witnesses:
John J. Kittel
Roxie Dobson

Inventor
Philip Golombeck
By his Attorney
Edward C. Davidow

P. GOLOMBECK.
CYLINDER WELDING APPARATUS.
APPLICATION FILED JULY 8, 1914.

1,188,927.

Patented June 27, 1916.
4 SHEETS—SHEET 3.

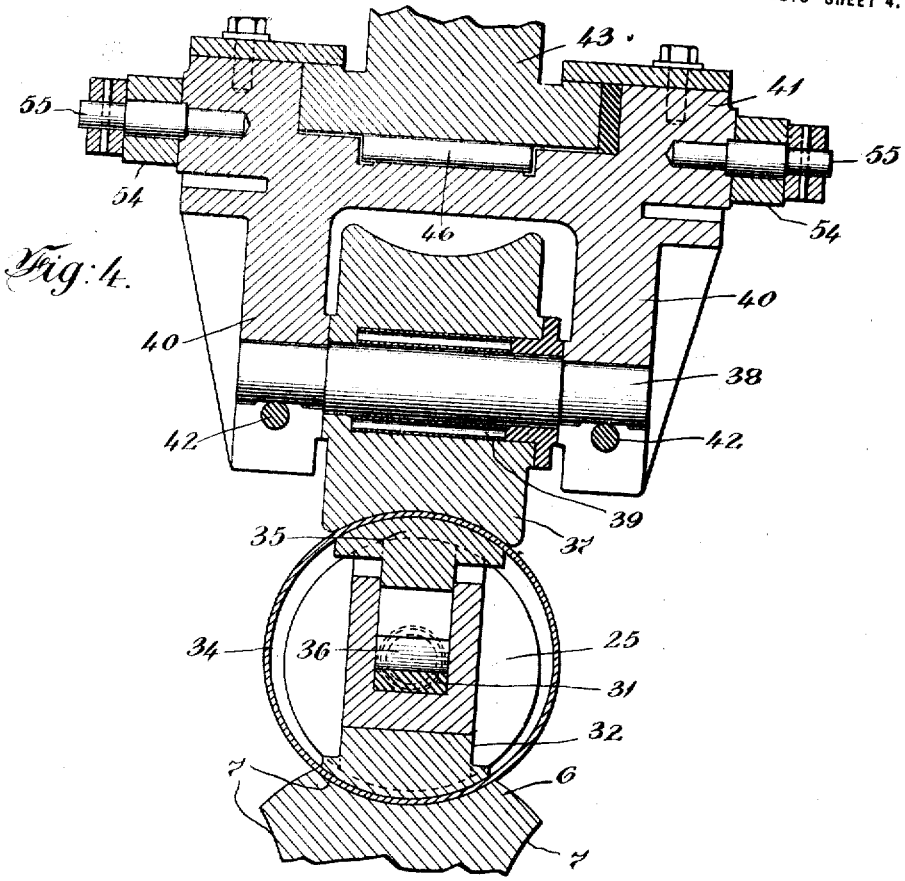
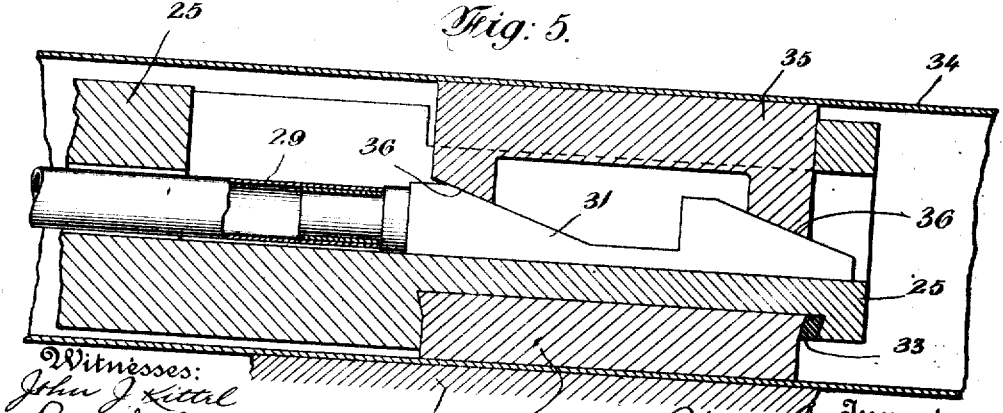

UNITED STATES PATENT OFFICE.

PHILIP GOLOMBECK, OF HOBOKEN, NEW JERSEY, ASSIGNOR TO THE M. W. KELLOGG CO., OF NEW YORK, N. Y., A CORPORATION OF NEW JERSEY.

CYLINDER-WELDING APPARATUS.

1,188,927.   Specification of Letters Patent.   Patented June 27, 1916.

Application filed July 8, 1914. Serial No. 849,681.

*To all whom it may concern:*

Be it known that I, PHILIP GOLOMBECK, a subject of the Emperor of Germany, residing in Hoboken, county of Hudson, State of New Jersey, have invented certain new and useful Improvements in Cylinder-Welding Apparatus, of which the following is a specification.

This invention is designed to lap-weld long pieces of pipe.

It comprises a support upon which the material composing the pipe, cylindrically formed, is held throughout its length, and it is provided with a plurality of curved beds for different sizes of pipes; a carriage on which the pipe support is held; means for vertically adjusting the support and means for locking the support with any one of its curved beds in uppermost position. A mandrel is provided supported by one end on a suitable frame so as to extend over the pipe bed inside the pipe, said mandrel having an adjustable anvil at its free end controlled by a hydraulic cylinder and piston at the fixed end of the mandrel. The welding is produced by a roller, shaped to act on the outside of the pipe, located directly over the anvil and adapted to be reciprocated lengthwise of the pipe and pressed against the pipe by a hydraulic controller. These devices with other features of construction will, by reference to the accompanying drawings, now be described.

Figure 1:
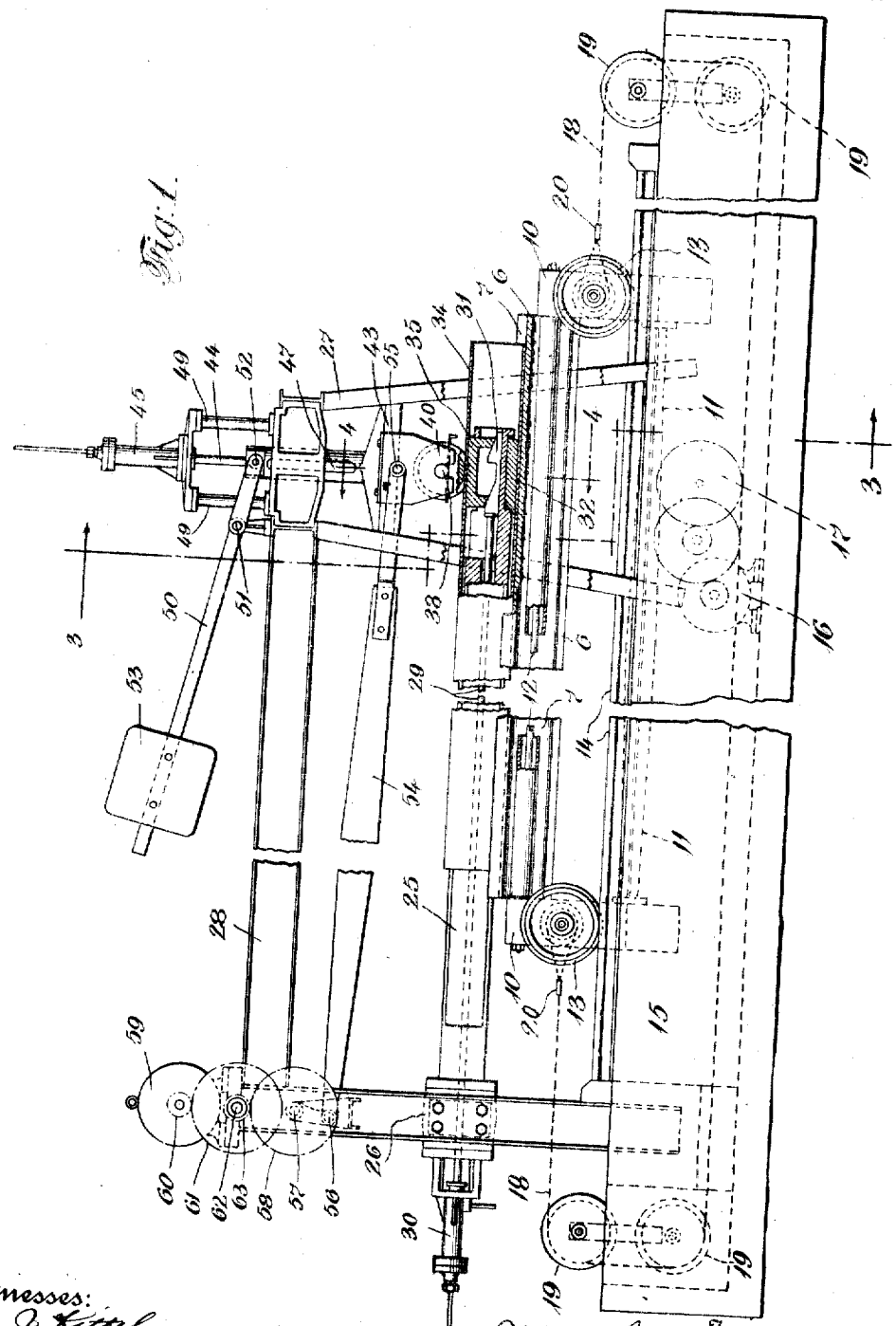
Figure 2:
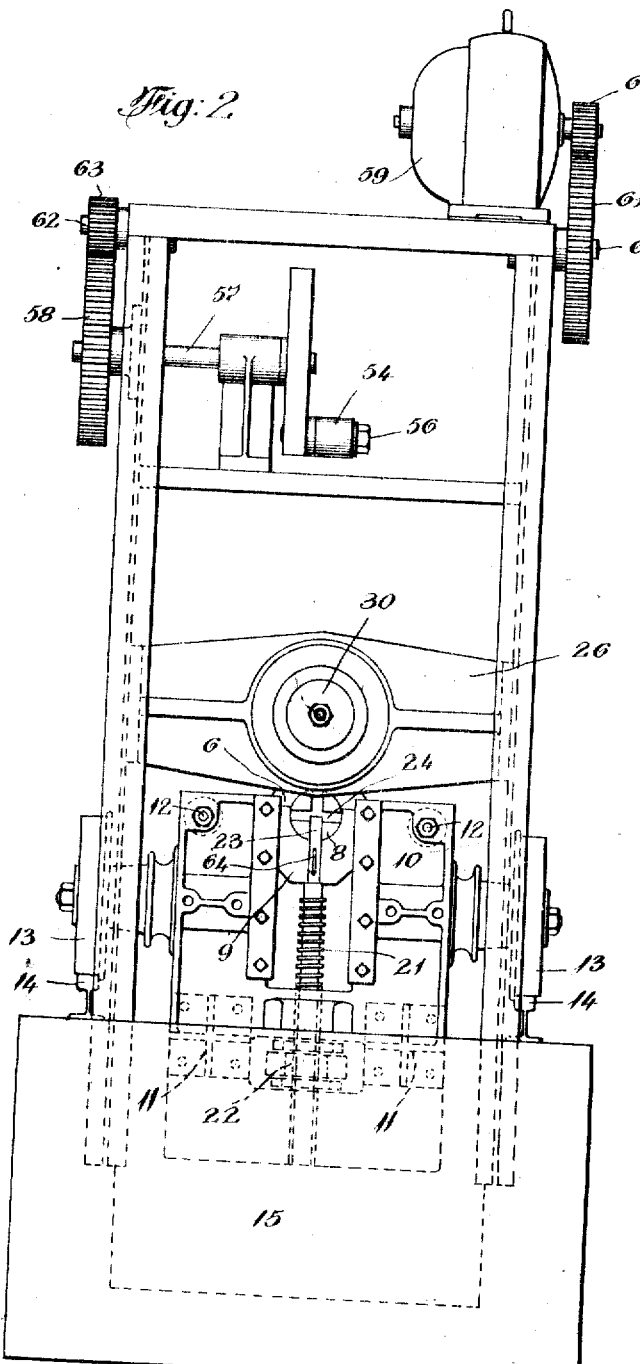
Figure 3:
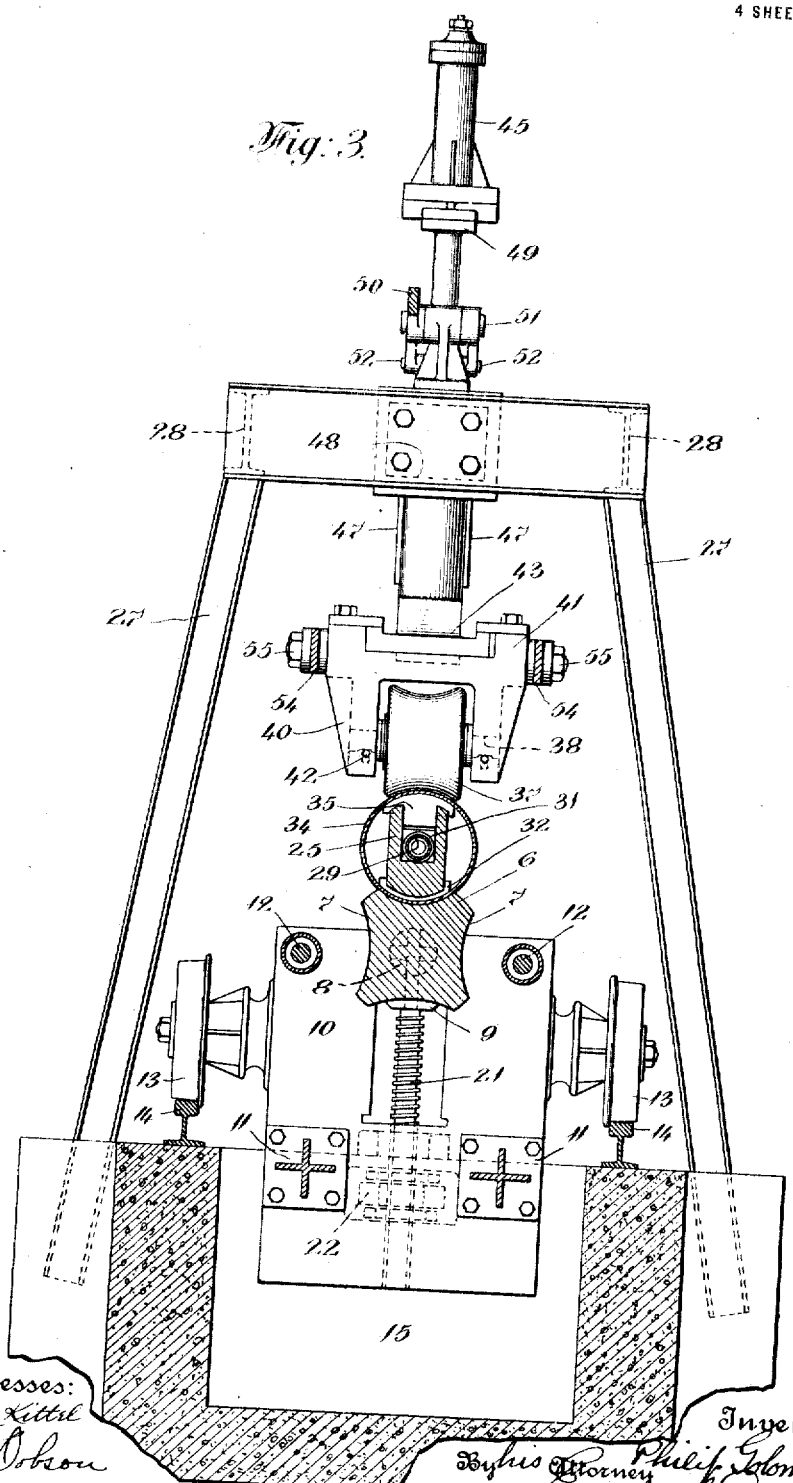

Figure 1 is a side elevation, partly in section, of a pipe welding machine embodying the features of this invention. Fig. 2 is an end view of the same, looking toward the right. Fig. 3 is a vertical section on the line 3, 3, Fig. 1. Fig. 4 is an enlarged sectional view of the welding roller, the anvil and the pipe support taken on line 4, 4, Fig. 1, and: Fig. 5 is a longitudinal section, on an enlarged scale, of the outer free end of the mandrel and the adjustable anvil.

The pipe support 6 is equal in length to, or somewhat in excess of, the longest pipe the machine is adapted to weld. It has a series of grooves of different curvatures formed in it throughout its length, constituting beds 7 for pipes of different sizes, and is provided with trunnions 8 at its ends seated in vertically movable blocks 9. These blocks are fitted to slide in end frames 10 of the carriage. As many pipe beds 7 as the cross section of the support 6 will admit of may be provided, four being shown in the drawings.

The end frames 10 of the carriage are connected together at their lower parts by girders 11 and at their upper parts by tie rods and spacing lengths of pipe 12, each end frame being provided with a pair of wheels 13 that run on tracks 14 located at the sides of a pit 15, into which the lower ends of the frames 10 extend. The tracks 14 are sufficiently long to admit of the pipe support being moved beyond the mandrel and anvil and entirely over the same. Means are provided for moving the carriage, consisting of a motor 16 and a drum 17, driven thereby, which controls a rope or chain 18 passing over guide sheaves 19 located at the ends of the pit 15, said rope or chain being connected by its ends to the frames of the carriage through the medium of suitable yokes 20.

The pipe support holding blocks 9 are vertically adjusted by screws 21 which are raised and lowered by ratchet wheels 22 set in openings in the end frames 10 of the carriage and actuated by suitable means. Pieces 23 are adjusted to pass through lugs on the blocks 9, and are sized to fit snugly into holes or grooves 24 in the trunnions 8, of the pipe support 6, arranged so that the bed 7 in use will be held in proper relation to the other parts of the machine.

The mandrel 25 is rigidly connected at one end to the end piece 26 of the main frame of the machine and extends under the other end piece 27, said end pieces of the frame being suitably constructed and joined together at their upper ends by longitudinal girders 28. This mandrel has a longitudinal bore through which passes a pipe extension 29 of the ram of a hydraulic cylinder 30, connected to the outer side of end piece 26, and to the end of this ram extension 29 is secured a double wedge piece 31 fitted to slide on the inside of the free end of the mandrel 25. This end of the mandrel is provided with a detachable shoe 32 held in a transverse dovetail groove by a wedge 33. There is provided a shoe 32 for each size of pipe to be welded, formed to fit the interior of the pipe, which rests on the support 6, in the pipe bed 7 of the same circularity as the exterior of the pipe, as clearly shown in Figs. 4 and 5. 34 indicates the pipe. These views also show an anvil 35 rounded at its upper surface to fit the interior of the pipe to be welded and fitted to slide vertically in the outer part of the mandrel 25. Inclined bearings 36 are formed on the anvil adapted to coact with the double wedge piece 31. This arrangement is such that when the wedge piece is withdrawn by the hydraulic controller 30, the anvil end of the mandrel is contracted, leaving the pipe free to be moved by its carriage, away from the mandrel so that its seam part may be heated by a suitable furnace, or with the heated part of the pipe set over the anvil for the seam to be welded by the welding device, now to be described.

The welding means comprises a roller 37 having a groove shaped to fit over the outside of the pipe to be welded and free to rotate on a short shaft 38 with anti-friction rollers 39 preferably placed in the roller bearing. Shaft 38 is held in the forks 40 of a slide 41, the bearings of the shaft being open downwardly to permit of the ready removal of the welding roller and of replacing it by another one having a different shaped groove adapted to fit over and act on a different size pipe. Cotter pins 42 are shown to hold the roller and the shaft in the fork of the slide 41. A head 43 carried by the ram or piston rod 44 of a vertically arranged hydraulic cylinder 45 has guides on its sides on which the slide 41, by coacting guide ways, is free to slide in direction paralled to the mandrel and to the pipe 34 held on the pipe bed. It is preferred to employ anti-friction rollers 46 between the pressure resisting surface of the slide 41 and head 43. On the sides of the stem of the head 43 are keys or splines 47 that fit and slide in corresponding grooves formed in the bearing 48, centrally located in the upper part of the end piece 27 of the main frame, thereby holding the guides of the head on which the slide 41 reciprocates parallel to the axis of the mandrel and pipe. The hydraulic cylinder 45 is supported and held co-axially with the bearing 48 by a cross piece and standard posts 49.

50 designates a lever having its fulcrum 51 on a standard, projecting from the frame, and with its short end pivoted at 52 to the stem of the head 43, the long end of this lever being provided with a counter-weight 53, whereby the head 43 and its attached parts are over-balanced and the welding roller 37 raised away from the pipe 34 when the pressure in the cylinder 45 is released.

The slide 41 may be actuated by any adequate means to cause the roller 37 to reciprocate on the part of the seam of the pipe located over the anvil 35. A suitable mechanism for this purpose is a connecting rod 54 having one end forked and connected by studs 55 to the side of the slide 41 and its other end engaged by a crank 56 carried by a shaft 57, a gear wheel 58 on shaft 57 and driven by a motor 59 through the medium of a pinion 60 on the motor, a gear 61 on a shaft 62 and a pinion 63 on this shaft meshing into the gear wheel 58. The motor and gearing are located at the upper part of the end piece 26 of the main frame.

The pipe supporting bed 6 is, as before described, held with any one of the pipe beds 7 in operative position by the pieces 23 which pass through lugs on the blocks 9 and enter slots or openings 24 formed in the trunnions 8. When it is desired to change the pipe bed for a different size pipe, the pieces 23 are moved down until their ends clear the trunnions. Their downward movement for this purpose is determined by pins which pass through slots 64 formed through the reduced portions of the screws, or pins in said reduced portion acting in slots formed in the sliding blocks 9. When the blocks 9 are supported by shoulders on the screws then they and the pipe support 6 may be vertically adjusted to bring the center of the pipe resting on the support in line with the axis of the anvil with the anvil expanded to fit the interior of the pipe: thus a rigid solid support will be provided for the proper action of the welding roller 37, under pressure due to the hydraulic controller 45, to press and roll the seam against the anvil 35.

It will be observed that the welding operation is performed by the combined downward pressure of the roller 37 on the seam of the pipe and the longitudinal movement of the roller lengthwise on the seam, and that the pipe is firmly supported during this operation by the support 7 and by an anvil which is expanded within the pipe and bears against the seam and also against the opposite side of the pipe.

I claim—

1. A pipe welding machine, comprising means for supporting the pipe on its under side, a roller for closing the seam which is forcibly pressed against the seam and is at the same time reciprocated longitudinally thereover, and a mandrel within the pipe supporting an anvil firmly held between and pressing against the bottom of the pipe and the top thereof.

2. In a pipe welding machine, the combination of means for supporting a pipe and for moving it endwise, a roller adapted to bear on the seam of the pipe, an anvil supporting the seam and pressing against the opposite side of the pipe, means for forcibly pressing the roller on the seam and means for reciprocating the roller endwise over the pipe while pressed against the seam.

3. In a pipe welding machine, the combination of means for supporting a pipe, a mandrel, an expansible anvil thereon adapted to bear firmly against the seam of the pipe and against that side of the pipe opposite the seam, and means moving back and forth longitudinally of the seam above said mandrel and outside the pipe for applying pressure to the seam.

4. A pipe welding machine, comprising a pipe support having a plurality of pipe beds, each adapted to support a pipe, to be welded, throughout its length, means for holding the pipe support with any one of the pipe beds in operative position, a carriage on which the pipe support is carried, means for moving the carriage, a mandrel held by one of its ends and over which the pipe is moved by the carriage and means for pressing the seam side of the pipe.

5. A pipe welding machine, comprising a rotatable pipe support having a plurality of pipe beds, each adapted to support a pipe, to be welded, throughout its length and means for holding the pipe support with any one of the pipe beds in operative position.

6. A pipe welding machine, comprising a rotatable pipe support having a plurality of pipe beds, each adapted to support a pipe, to be welded, throughout its length, means for holding the pipe support with any one of the pipe beds in operative position, a mandrel adapted to be located in a pipe held on the support and means for closing the seam of the pipe by a rolling pressure.

7. A pipe welding machine, comprising a rotatable pipe support having a plurality of pipe beds, each adapted to support a pipe, to be welded, throughout its length, means for holding the pipe support with any one of the pipe beds in operative position, a mandrel adapted to be located in a pipe held on the support, said mandrel being supported at one end and having an expansible anvil at its free end, means for raising the anvil, means for moving the support and setting different parts of the pipe over the anvil, and means for closing the seam of the pipe by acting on the portions of the seam set over the anvil.

8. A pipe welding machine, comprising a rotatable pipe support having a plurality of pipe beds, each adapted to support a pipe, to be welded, throughout its length, means for holding the pipe support with any one of the pipe beds in operative position, a mandrel adapted to be located in a pipe held on the support, said mandrel being supported at one end and having an expansible anvil at its free end, a hydraulic cylinder at the fixed end of the mandrel with its plunger extended to the anvil and provided with a wedge acting on inclined faces on the under part of the anvil and means for closing the seam of the pipe by acting on portions of the seam successively set over the anvil.

9. A pipe welding machine, comprising a pipe support having a plurality of pipe beds, each adapted to support a pipe, to be welded, throughout its length, means for holding the pipe support with any one of the pipe beds in operative position, a carriage on which the pipe support is carried, a track for the carriage, a chain attached to the ends of the carriage and a motor driven gearing for actuating the chain.

10. A pipe welding machine, comprising a rotatable pipe support having a plurality of pipe beds, each adapted to support a pipe, to be welded, throughout its length, means for holding the pipe support with any one of the pipe beds in operative position, a mandrel adapted to be located in a pipe held on the support, said mandrel being supported at one end and having an expansible anvil at its free end, means for raising the anvil, means for moving the support and setting different parts of the pipe over the anvil, a welding roller grooved to fit the outside of the pipe, means for reciprocating the roller longitudinally over the portion of the pipe over the anvil and a hydraulic cylinder for pressing the roller against the pipe.

11. A pipe welding machine, comprising a pipe support having a plurality of pipe beds, each adapted to support a pipe, to be welded, throughout its length, means for holding the pipe support with any one of the pipe beds in operative position, a carriage on which the pipe support is carried, means for moving the carriage, a mandrel held by one of its ends and over which the pipe is moved by the carriage, means for pressing the seam side of the pipe and means on the carriage for vertically adjusting the pipe support.

12. A pipe welding machine, comprising a pipe support having a plurality of pipe beds, each adapted to support a pipe, to be welded, throughout its length, means for holding the pipe support with any one of the pipe beds in operative position, a mandrel held by one of its ends in a horizontal position, means for longitudinally moving the pipe support to set a pipe carried thereby over the mandrel, means for vertically adjusting the pipe support and means adapted to act on and close the seam of the pipe.

13. A pipe welding machine, comprising a pipe support having a plurality of pipe beds, each adapted to support a pipe, to be welded, throughout its length, and having trunnions on its ends provided with openings or grooves corresponding in number to the pipe beds, vertically sliding blocks affording bearings for the pipe support, a carriage in the ends of which the blocks are held and screws for controlling the blocks having their upper ends adapted to enter the openings of the pipe support trunnions and thereby hold the said bed of the pipe support in operative position.

14. In a pipe welding machine, a mandrel fixedly held by one of its ends, an adjustable anvil carried by the other end of the mandrel and having inclined bearing surfaces at its lower part, a hydraulic cylinder at the fixed end of the mandrel with its plunger extended to the anvil end thereof and a wedge secured to the end of the plunger extension and adapted to act on the inclined surfaces of the anvil.

15. In a pipe welding machine, a mandrel fixedly held by one of its ends, an adjustable anvil carried by the other end of the mandrel and having inclined bearing surfaces at its lower part, a hydraulic cylinder at the fixed end of the mandrel with its plunger extended to the anvil end thereof and a wedge secured to the end of the plunger extension and adapted to act on the inclined surfaces of the anvil, a pipe support adapted to be placed under the anvil, means for vertically adjusting the support and a reciprocating welding roller arranged to act on the pipe over the anvil.

16. In a pipe welding machine, in combination, a grooved welding roller, a shaft therefor, a vertically adjustable forked slide provided with bearings for the roller shaft, a head upon which the slide is fixed to reciprocate, means for reciprocating the slide, a hydraulic motor for depressing the head and a counterweighted lever for raising the roller.

17. In a pipe welding machine, in combination, a mandrel supported at one end and having at its free end a detachable anvil, means for vertically adjusting the anvil, a detachable shoe beneath the anvil and means for securing the shoe to the mandrel.

In testimony whereof, I have hereunto subscribed my name.

PHILIP GOLOMBECK.

Witnesses:
DAVID MACPHEE,
C. D. LANDRY.

Copies of this patent may be obtained for five cents each, by addressing the "Commissioner of Patents, Washington, D. C."

anvil carried by the other end of the mandrel and having inclined bearing surfaces at its lower part, a hydraulic cylinder at the fixed end of the mandrel with its plunger extended to the anvil end thereof and a wedge secured to the end of the plunger extension and adapted to act on the inclined surfaces of the anvil.

15. In a pipe welding machine, a mandrel fixedly held by one of its ends, an adjustable anvil carried by the other end of the mandrel and having inclined bearing surfaces at its lower part, a hydraulic cylinder at the fixed end of the mandrel with its plunger extended to the anvil end thereof and a wedge secured to the end of the plunger extension and adapted to act on the inclined surfaces of the anvil, a pipe support adapted to be placed under the anvil, means for vertically adjusting the support and a reciprocating welding roller arranged to act on the pipe over the anvil.

16. In a pipe welding machine, in combination, a grooved welding roller, a shaft therefor, a vertically adjustable forked slide provided with bearings for the roller shaft, a head upon which the slide is fixed to reciprocate, means for reciprocating the slide, a hydraulic motor for depressing the head and a counterweighted lever for raising the roller.

17. In a pipe welding machine, in combination, a mandrel supported at one end and having at its free end a detachable anvil, means for vertically adjusting the anvil, a detachable shoe beneath the anvil and means for securing the shoe to the mandrel.

In testimony whereof, I have hereunto subscribed my name.

PHILIP GOLOMBECK.

Witnesses:
DAVID MACPHEE,
C. D. LANDRY.

---

Correction in Letters Patent No. 1,188,927.

It is hereby certified that in Letters Patent No. 1,188,927, granted June 27, 1916, upon the application of Philip Golombeck, of Hoboken, New Jersey, for an improvement in "Cylinder Welding Apparatus," an error appears in the printed specification requiring correction as follows: Page 4, line 27, claim 16, for the word "fixed" read *fitted*; and that the said Letters Patent should be read with this correction therein that the same may conform to the record of the case in the Patent Office.

Signed and sealed this 30th day of January, A. D., 1917.

[SEAL.]

F. W. H. CLAY,
*Acting Commissioner of Patents.*

Cl. 78—87

It is hereby certified that in Letters Patent No. 1,188,927, granted June 27, 1916, upon the application of Philip Golombeck, of Hoboken, New Jersey, for an improvement in "Cylinder Welding Apparatus," an error appears in the printed specification requiring correction as follows: Page 4, line 27, claim 16, for the word "fixed" read *fitted;* and that the said Letters Patent should be read with this correction therein that the same may conform to the record of the case in the Patent Office.

Signed and sealed this 30th day of January, A. D., 1917.

[SEAL.]

F. W. H. CLAY.
*Acting Commissioner of Patents*

Cl. 78—87